Jan. 16, 1968  G. BUTLER  3,363,981
PRODUCTION OF FINELY DIVIDED OXIDES BY PLASMA PROCESS
Filed May 9, 1966
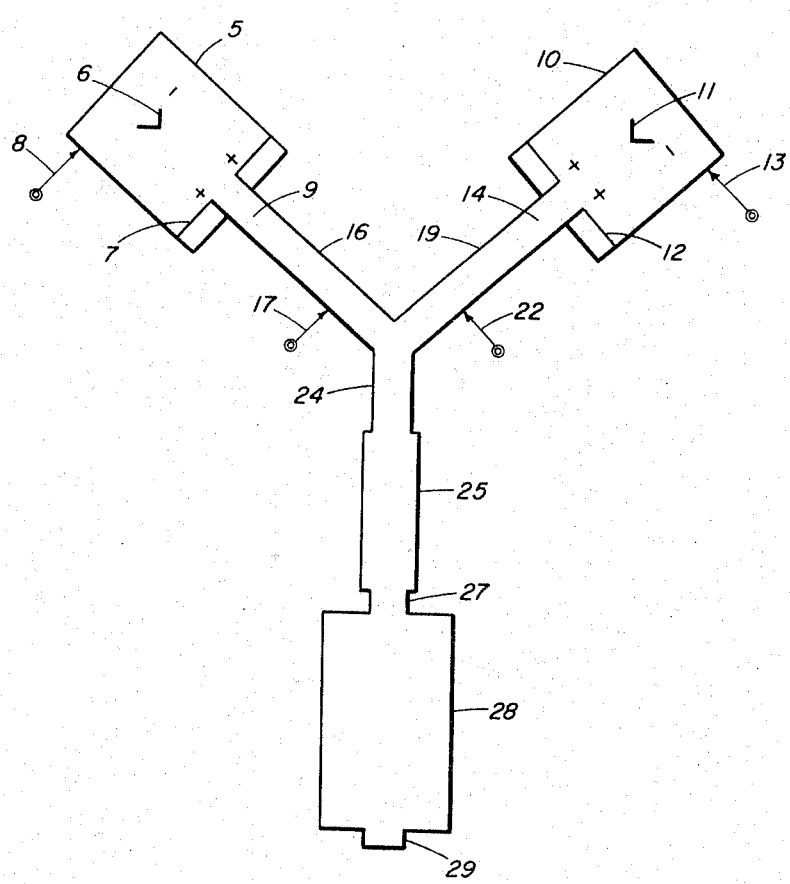
INVENTOR.
GERARD BUTLER ated Jan. 16, 1968

3,363,981
PRODUCTION OF FINELY DIVIDED OXIDES BY PLASMA PROCESS

Gerard Butler, Norwalk, Conn., assignor to American Cyanamid Company, Stamford, Conn., a corporation of Maine
Continuation-in-part of application Ser. No. 451,049, Apr. 26, 1965. This application May 9, 1966, Ser. No. 548,377
8 Claims. (Cl. 23—202)

ABSTRACT OF THE DISCLOSURE

The present invention relates to the conversion of a metal or metalloid salt to the corresponding oxide by contacting the salt with an oxygen-containing gas, both being heated separately by means of plasma streams and caused to converge upon each other in a manner such that the vector sum of the momenta flows of the reactant streams is directed along the axis of a cylindrical section of the reactor. Balanced momentum can be achieved by various means with the result that reactor plugging due to oxide deposition is materially reduced and delayed so that a reactor can be in operation for a long period without plugging and consequent shutdown.

---

This application is a continuation-in-part of application Ser. No. 451,049, filed Apr. 26, 1965, now abandoned.

This invention relates to an improved process for making particulate oxides of refractory metals and metalloids. More particularly, it relates to an improved method for conducting high temperature oxidation processes in the plasma jet.

Refractory metal and metalloid oxide powders have found wide industrial usage as pigments, catalysts, rubber fillers, paper fillers and in the manufacture of gems. Naturally occurring oxides are not normally of sufficient purity to be suitable in these areas either because of insufficient purity or the difficulty associated with uniformly reducing them to the correct particle size range. Consequently, various methods have been developed to enable the preparation of fine oxide powders by chemical synthesis involving the conversion of relatively pure metal and metalloid salts. Widely used conversion procedures have involved either hydrolytic or oxidative reactions conducted in such a manner as to insure the formation of the final product as a pure solid in a finely divided state. Known methods of conducting these processes have met with varying degrees of partial success and efforts to develop improved procedures have continued over the years.

One recent development achieves the production of oxides by the use of the hot effluent of a plasma generator to heat the metal or metalloid salt and oxygen to reaction temperatures and then mixing the two streams. The product obtained by this method is of high quality insofar as purity is concerned. A problem which arises is the speed with which the reactor is plugged by the continuing deposition of solid product on the walls of the reaction vessel and in the area immediately surrounding the inlets of the reactant stream. Shut-down is often required after relatively short periods of reaction so that plugs may be removed.

This extremely undesirable shortcoming was solved to a surprising degree by an innovation which is the subject matter of copending application Ser. No. 430,262, filed Feb. 4, 1965, now U.S. Patent 3,275,412, issued Sept. 27, 1966. In accordance with the invention of said copending application, the reactant streams, i.e., the oxygen-containing stream and the vaporous salt stream, are brought together at an angle with respect to each other of between 25° and 160° to form the reaction mixture and the reaction mixture is then discharged into a reaction zone. When operating according to that procedure, plugging of the reactor in the region immediately surrounding the inlet of the reactant streams is delayed considerably and operational periods are relatively long before shut-down is required. Notwithstanding the great improvement which has been achieved in accordance with the foregoing, it is nevertheless a fact that deposition of product in the reactor is still a troublesome problem and there remains a need for improved methods to prolong the operating periods.

It is an object of the present invention to provide an improved method of preparing finely divided metal and metalloid oxides with a plasma jet in such a manner that the reaction is rapid whereas the plugging of the reaction vessel is avoided for periods which heretofore were unattained. Other objects will be apparent from the following description of the invention.

In accordance with the present invention, a vaporous metal or metalloid salt and oxygen-containing gas are heated separately by means of plasma streams and caused to converge upon each other in the manner disclosed in the above-mentioned copending application, with the additional requirement that the vector sum of the momenta flows of the reactant streams is directed along the axis of the cylindrical reactor. Balanced momentum can be achieved by various means as will be described hereinafter in detail. The result of operating in accordance with the present invention is a better product from an over-all standpoint and the avoidance of reactor plugging for longer periods of operation.

The present invention is useful for the production of any kind of refractory metal or metalloid oxide or mixtures of such oxides, said mixtures being the subject of commonly assigned, copending application Ser. No. 507,525, filed Nov. 12, 1965. The oxidizable starting material can be any inorganic metal or metalloid salt such as a halide (for example, a chloride or fluoride) or an oxyhalide (for example, the oxychloride). The metal or metalloid salts which can be converted are exemplified by silicon, titanium, aluminum, zirconium, iron and antimony compounds. It is feasible to use mixtures of such salts. Most important of the oxidizable compounds which can be converted by the plasma jet oxidation process are zirconium tetrahalide, silicon tetrahalide and titanium tetrahalide. These materials give oxide powders used in pigment, catalyst, rubber and paper applications. Aluminum oxides suitable for gem manufacture may also be produced by oxidation of the corresponding aluminum salt.

At least one of the reactants (i.e., the vaporous salt or oxygen) is separately admixed with a plasma stream. For example, a metal or metalloid salt can be admixed with one stream of heat-supplying plasma, and, if desired, the oxygen-containing gas can be separately admixed with another stream of heat-supplying plasma. The two streams, flowing so as to have approximately equal and oppositely directed momentum components perpendicular to the reactor axis are caused to converge at an angle with respect to each other of between about 25° and 160°, to form the reaction mixture which will then flow on through the reactor.

The flow rate of momentum of a given stream is the product of the stream's linear velocity and mass flow rate. The linear velocity can be calculated from the mass flow rate, cross sectional area and density of the stream, while the density is a function of the average molecular weight, and the pressure and temperature of the stream. Thus $$M = \left(\frac{RTq}{p\bar{m}a}\right) \cdot q$$

where
$M$=Momentum flow rate in units of gm., cm., sec.$^{-2}$
$R$=Universal gas constant (approx.=82) in units of atm., cm.$^3$, mole$^{-1}$, ° K.$^{-1}$
$T$=Absolute temperature in units of ° K.
$p$=Absolute pressure in units of atm.
$\bar{m}$=Average molecular weight in units of gm. mole$^{-1}$
$q$=Mass flow rate in units of gm., sec.$^{-1}$
$a$=Cross sectional area in units of cm.$^2$ It can be seen that $p\bar{m}/RT$ is the density of the stream while the expression in the parentheses represents the stream's linear velocity. The momentum component perpendicular to the reactor axis is the above-mentioned momentum flow M multiplied by the sine of the angle included between the reactor axis and the direction of flow before mixing, and it is directed towards said axis in a plane containing both the reactor axis and the initial flow direction.

The pressures of the two streams are necessarily equal at the point of mixing and therefore pressure cannot be used to vary the relative momentum of the two streams. Since R is a constant, only four quantities remain which can be used to adjust the total momentum flow of each stream. The momentum components may then be balanced by changing the reactant's relative flow direction. Even though any of these four variables, alone or in combination, can be used to obtain the desired momentum flow, other considerations prescribe or partially limit the range of some of these. For example, the temperature must be such that the combined streams are above the reaction's initiation temperature; the mass flow rate and the average molecular weight is determined by the required mole ratios of the reactants and the fraction of diluents such as plasma or inert gas present in the stream; the cross sectional area is the only free variable for design purposes but is obviously fixed for any given piece of equipment.

The factors which enter into the determination of momentum balance can be illustrated by considering the case where titanium dioxide is produced by introducing into the reaction zone, through the respective arms of a symmetrical 90° Y coupling where the reactor axis is vertical, preheated oxygen and titanium tetrachloride streams. For simplicity, the factors of reactant dilution with heating plasma, chemical dissociation and non-ideality of gases, are not taken into account in the calculations. Therefore, it is assumed that a stream of one mole per second of titanium tetrachloride at 1500° K. and atmospheric pressure is flowing in a 10 cm. diameter duct and this will cause it to have a total momentum flow of about 3×10$^5$ g. cm./sec.$^2$ and a horizontal component of about 2.1×10$^5$ g. cm./sec.$^2$.

Oxygen, in a 100 percent excess over stoichiometry (i.e. 64 grams per second) flowing in a 10 cm. diameter duct at 1500° K. has a momentum flow of only 2×10$^5$ g. cm./sec.$^2$ and its horizontal component is only about 1.4×10$^5$ g. cm./sec.$^2$. The momenta of the two streams may be balanced in various ways. For example: balance is achieved by feeding two moles per second of oxygen at a temperature of about 2200° K. through a 10 cm. diameter duct. Alternatively, by reducing the cross section of the stream by use of an 8 cm. diameter duct carrying two moles per second oxygen at 1500° K., the balance of momenta is also obtained. Another way to accomplish the same end is to increase the molar ratio of oxygen to titanium tetrachloride from 2 to about 2½ (thus feed 80 g. oxygen per second) while maintaining the temperature at 1500° K. and using a 10 cm. diameter duct. Finally, if 8 weight percent of the oxygen is replaced with helium, the previous mass flow rate of 64 grams/second, temperature of 1500° K., and 10 cm. diameter duct may be maintained and the momenta are still balanced since now the average molecular weight of the oxygen stream has been reduced. Moreover, it is possible to balance the momentum components without adjusting the total momentum flow. For example, instead of having both streams entering the reaction zone at an angle of 45° from the vertical, one may introduce the titanium tetrachloride at an angle of only 30° thus reducing its horizontal components to within 10 percent of that of the oxygen stream. If it is desirable to maintain the 90° angle of the Y, a balance may still be accomplished by introducing the vaporous salt stream at an angle of 34° from the vertical and the oxygen stream at an angle of 56° from the vertical. In these illustrations, only one of the available variables was changed at a time on one of the streams to show the scope of the invention. However, it is within the skill of the art to adjust any or all of the variables in combination to achieve the desired momentum balance.

In preferred practice, it is desirable to have the reactant streams at approximately the same temperature where they contact each other so that the oxide product will not tend to condense on the wall surface surrounding the entry of the cooler reactant. The general use of reactant streams of equal temperature is the subject of commonly assigned copending application Ser. No. 480,506, filed Aug. 17, 1965. Such a condensation would otherwise result in constriction and eventual plugging of the reactant entry port. In addition, thermal gradients cause an undesirable broad particle size distribution. To accomplish the objective of having the reactant streams of equal momentum and yet of the same temperature, it is necessary to obtain the momentum balance either by dilution to adjust mass flow of reactant or by reducing the cross section of the oxygen stream below that of the tetrachloride stream to the point at which the velocity of the former is high enough to give it the proper momentum or to resort to a non-symmetrical Y.

In using an oxygen stream of small cross-sectional area, it may be desirable for maximum mixing to have the oxygen spread across the entire dimension of the tetrachloride stream in the dimension of the latter along the line perpendicular to the plane containing the axes of both streams. This can be accomplished without changing momentum by designing the oxygen port with an oval or oblong shape with the long axis equal to the diameter of the other port and positioned perpendicular to the plane containing the axes of both streams or else by having multiple small ports spaced along the same perpendicular line. By either of these methods, it is possible to substantially enhance mixing efficiency as compared with the system in which oxygen is introduced over only a fractional part of the tetrachloride stream.

Referring now to the drawing, a plasma generator 5 is of a conventional design and has a negative electrode 6 and an annular positive electrode 7. An inert gas, such as nitrogen, is fed to the generator 5 by means of line 8 and it flows longitudinally between the electrodes 6 and 7 to an exit point 9. The flow of inert gas through the generator stabilizes the arc and becomes heated to the desired preheat temperature. A second plasma jet generator 10 also contains a negative electrode 11 and an annular positive electrode 12. The inert gas supplied is fed to the generator 10 by means of line 13 and it passes longitudinally within the generator 10 between the negative electrodes 11 and 12 and thus stabilizes the electric arc. The inert gas leaves the generator 10 at exit point 14.

The inert gas discharged from generator 5 flows into pipe 16. Oxygen is fed to the pipe 16 by means of line 17 downstream of exit point 9 of generator 5. Regarding generator 10, preheated inert gas flows into pipe 19 downstream of exit point 14 of generator 10. The metal or metalloid salt to be oxidized is fed into pipe 19 by means of line 22. Pipes 16 and 19 form an angle between about 25° and 160° with respect to each other.

The preheated inert gas streams flowing in pipes 16 and 19 join in a conduit 24 in a manner such that the sum of the momenta of the two inert gas streams is directed along the axis of conduit 24 and reactor 25. Conduit 24 serves as a mixing zone for the streams flowing from pipes 16 and 19. The conduit 24 is connected with reactor 25. The reactor 25 is connected with pipe 27 which in turn is connected to a water cooled exchanger 28. The cooled product of reaction leaves exchanger 28 by means of pipe 29.

Any conventional type of plasma generator is suitable for heating the reactant streams to temperatures at which reaction is initiated. The plasma (the term "plasma" being employed to designate a hot, partially ionized gas stream) is contacted with the material to be oxidized and an oxygen-containing stream. The heated reactant streams are brought together through a Y mixing chamber as above-described and the desired oxidation reaction is initiated. The resultant oxide product is secured by quenching the reactant effluent and collecting by conventional means the precipitated oxide powder.

The inert fluid used to form the plasma may be any gaseous material such as nitrogen, xenon, argon or helium. The plasma used to heat the oxygen-containing stream may also contain oxygen either pure or in a mixture such as air.

Generally, the plasma should be heated to a temperature of about 3,000° to 12,000° C. prior to being admixed with the reactant material. The quantity of plasma in the hot reactant mixture should be about 3–95% of the latter on a volume basis. Within this range, it is preferred to use about 5–45% of plasma based on the total volume of the plasma and the reactant gas.

The temperature at which the oxidation reaction is initiated will, of course, depend upon the particular salt which is being oxidized. The actual temperature to which the reactants are raised may be well above the initiation temperature in order to hasten the rate of reaction and this will, in general, affect the particle size of the product. The reaction mixture should be maintained in the zone of reaction for a period of 0.001 second to one second. Within this range of time, a residence of about 0.02 to 0.1 second is more usual and practical.

In the case of titanium dioxide where it may be desired to enhance the yield of the rutile crystalline form as against the anatase form, a small amount of aluminum chloride may be fed into the reaction zone, as for example, by admixture with the titanium tetrachloride reactant stream. The amount of aluminum chloride used for this purpose may vary over a wide range. In general, about 0.16 to 6.3% or, more preferably, 1.6 to 4.7% by weight of the product oxide should be employed. Advantageously, titanium dioxide pigment produced by this method (with or without aluminum chloride) is found to have a large proportion of particles in the optimum size range of 0.17 to 0.22 micron.

The amount of oxygen used will, in the first instance, depend upon the stoichiometry of the reaction. For practical results, at least a stoichiometric amount should be used based upon the salt to be oxidized. It is normally desirable to have an excess of oxygen available for reaction. This excess can, without practical inconvenience, be as high as 100% by volume, or even higher. More usually, a 15–50% by volume excess of oxygen is employed with good results.

The examples which follow are presented for purposes of illustrating the present invention.

EXAMPLE 1

Two nitrogen plasmas at essentially atmospheric pressure are used to heat separately streams of $O_2$ and $TiCl_4$. The heated streams are independently fed into the arms of a Y coupling and the mixture which forms at the junction of the arms flows through the leg (positioned along the line bisecting the angle between the arms) into a 2" diameter reactor tube. The mass flow rates were as follows:

|  | g./sec. |
|---|---|
| $N_2$ stream for preheating $O_2$ | .312 |
| $O_2$ stream | 2.32 |
| $N_2$ stream for preheating $TiCl_4$ | .387 |
| $TiCl_4$ stream | 6.57 |

These flows correspond to a 110% excess of $O_2$ over the stoichiometric requirements. The cross sectional areas of the arms of the Y were each 5.06 cm.$^2$. The estimated temperature of the $TiCl_4$ stream was 1300° K. and that of the oxygen stream was 2090° K. Mass flow was 2.63 g./sec. for the $O_2$ stream and 6.96 g./sec. in the $TiCl_4$-containing stream, with the average molecular weights being 31.4 and 144, respectively. The momentum flows of the two streams are within 5% of balance. After twenty minutes of operation, the reactor was inspected and found to be virtually free of pigmentary deposit, and the pigment produced in this run was of excellent quality.

EXAMPLE 2

The foregoing procedure was repeated identically, except that temperatures were adjusted so that the $O_2$ stream temperature was 1640° K. and the $TiCl_4$ stream temperature was 1650°. The momenta of these streams were thus 5850 g. cm./sec.$^2$ for the oxygen-containing stream and 9020 g. cm./sec.$^2$ for the $TiCl_4$ stream. The momentum components were thus out of balance and the flow vector of the resultant mixed stream formed a large angle with the long axis of the reactor. After only twelve minutes of operation under these conditions, the system became unsteady and the run was terminated. Inspection of the reactor showed that pigment deposit and resultant blockage of the flow were the cause of the poor operation and that the heaviest deposits were in the region where the flow was impinging. The pigment produced during this run was of somewhat lower quality, being 40 points lower in tinting strength as measured on the Reynolds scale.

EXAMPLE 3

*Preparation of $SiO_2$*

Silicon dioxide is prepared using equipment similar to that used in Example 1. An argon plasma is used to preheat the $O_2$ and a nitrogen plasma to preheat the $SiCl_4$, both at atmospheric pressure. The flow rates are:

|  | g./sec. |
|---|---|
| Argon stream for preheating $O_2$ | .446 |
| Oxygen | 1.67 |
| $N_2$ stream for preheating $SiCl_4$ | .39 |
| Silicon tetrachloride | 5.91 |

These flows represent a 50% excess of $O_2$ over that required by stoichiometry. The temperatures of the two streams are substantially equal at 1400° K. For the $O_2$- and $SiCl_4$-containing streams, respectively, the mass flow rates are 2.12 and 6.30 g./sec., and the average molecular weights are 33.5 and 130 g./mole. Substantially equal streams are substantially equal at 1400° K. For the $O_2$-arm of the Y-shaped coupling. This insert gives a cross-sectional area of 1.62 cm.$^2$ for the oxygen as compared to the 5.06 cm.$^2$ for the $SiCl_4$ flow channel, and results in a momentum balance within 6%. The product is characterized by a uniformly high state of subdivision and no blockage problems are encountered.

EXAMPLE 4

*Preparation of zirconium oxide*

In equipment similar to the previous Example, $ZrO_2$ is prepared by reacting $ZrCl_4$ with $O_2$, using an argon plasma to heat the $O_2$ stream and a helium plasma to heat the ZrCl$_4$ stream, all at atmospheric pressure. The flow rates are:

|  | g./sec. |
|---|---|
| Argon stream | .45 |
| O$_2$ stream | 3.34 |
| Helium stream | .06 |
| ZrCl$_4$ stream | 8.1 |

A large excess of oxygen is used (a 3/1 mole ratio) to obtain a very finely divided product and also to effect a momentum balance. The temperatures of the two streams are substantially equal at 1430° K. The mass flow rates are 3.79 and 8.16 g./sec. and the average molecular weights are 33 and 159 g./mole for the O$_2$- and chloride-containing streams. The cross-sectional areas of the ducts are equal at 5.06 cm$^2$. The momenta under these conditions are about 10,100 g. cm./sec.$^2$ for the O$_2$ stream and 9700 g. cm./sec.$^2$ for the ZrCl$_4$ stream. The product is very finely divided ZrO$_2$ with a uniform particle size distribution.

When an insert is used to change the cross-sectional area of the ZrCl$_4$ channel to 1.62 cm.$^2$, heavy oxide deposits result in the area of the off-axis jet impingement, and the particle size distribution has a significantly higher standard deviation, indicating poorer size control.

EXAMPLE 5

*Preparation of TiO$_2$-AlCl$_3$ Added to TiCl$_4$ Vapor*

The conditions of Example 1 were repeated with the only change being that 3.0% of the chloride feed consisted of AlCl$_3$. Momentum was balanced and excellent operation was achieved. The pigment had a much higher rutile content and was of higher quality as measured by its improved tinting strength.

EXAMPLE 6

In another experiment the following flow rates were used:

|  | g./sec. |
|---|---|
| Nitrogen plasma to heat O$_2$ stream | .31 |
| Oxygen stream | 1.66 |
| Nitrogen plasma to heat ZrCl$_4$ stream | .39 |
| Zirconium tetrachloride stream | 10.10 |

These flows correspond to a 20% excess O$_2$ over stoichiometry. The temperatures and average molecular weights of the two streams are 1600° K., 31.3 and 1540° K., 184, respectively. Both streams are at essentially atmospheric pressure and are flowing in 5.06 cm.$^2$ cross-sectional area ducts. The momentum flow of the oxygen stream is about 3,200 g. cm./sec.$^2$ while the salt stream has a total momentum of 14,800 g. cm./sec.$^2$. However, a balance is achieved by using a non-symmetrical Y where the oxygen stream enters at an angle of 50° from vertical and the ZrCl$_4$ stream enters at an angle of 10° from vertical. The reactor axis remains vertical. No blockage is observed and a good quality of ZrO$_2$ powder is obtained.

I claim:

1. In the process of continuously preparing finely divided refractory oxides by contacting an oxygen-containing stream with at least one stream of at least one member selected from the group consisting of vaporous metal and metalloid chloride or oxychloride salts, admixing at least one of said reactant streams with a stream of gaseous fluid heated by means of a plasma generator to a temperature in the range of 3,000°–12,000° C. and contacting said reactant streams flowing at an angle with respect to each other of between about 50° and 160° prior to entry of said flowing streams into a reactor, the improvement which comprises adjusting the momenta of the reactant streams so that the vector components which are perpendicular to the reactor axis are equal in magnitude and oppositely directed, whereby reactor plugging due to oxide build-up is substantially reduced for prolonged periods.

2. The process of claim 1 wherein one oxygen-containing stream is contacted with one salt-containing stream.

3. The process of claim 1 wherein two reactant streams flow at an angle with respect to each other of 70° to 120° and the reactant streams are of equal temperature just prior to said contacting.

4. The process of claim 1 wherein the plasma is a nitrogen gas.

5. The process of claim 1 wherein the vaporous salt is titanium tetrachloride.

6. In the process of preparing finely divided titanium dioxide by heating separately two streams of inert fluid by means of plasma generators to temperatures in the range of about 3,000° C. to 12,000° C., mixing titanium tetrachloride with one of the resultant plasma streams, the temperature of the resultant mixture being about 600° C. to 3,000° C.; mixing at least a stoichiometric amount of oxygen with the other plasma stream, the temperature of the second mixture being about 600° C. to 4,000° C., contacting the resultant reactant streams at an angle of about 90° with respect to each other to form a reaction mixture and passing the reaction mixture through a reaction zone, the improvement which comprises adjusting the momenta of the reactant streams so that the vector components which are perpendicular to the reactor axis are equal in magnitude and oppositely directed, whereby reactor plugging due to oxide build-up is substantially reduced for prolonged periods.

7. The process of claim 6 wherein aluminum chloride is introduced into one stream in an amount equal to about 0.16 to 6.3% by weight of product TiO$_2$.

8. The process of claim 6 wherein the respective reactant streams are of equal temperature just prior to said contacting.

References Cited

UNITED STATES PATENTS

| 3,148,027 | 9/1964 | Richmond | 23—202 X |
| 3,215,496 | 11/1965 | Groves | 23—202 |
| 3,245,818 | 4/1966 | Evans | 23—202 |
| 3,275,411 | 9/1966 | Freeman et al. | 23—202 |
| 3,275,412 | 9/1966 | Skrivan | 23—202 |

MILTON WEISSMAN, *Primary Examiner.*

EDWARD STERN, *Examiner.*

UNITED STATES PATENT OFFICE
CERTIFICATE OF CORRECTION

Patent No. 3,363,981                      January 16, 1968

Gerard Butler

It is hereby certified that error appears in the above numbered patent requiring correction and that the said Letters Patent should read as corrected below.

Column 3, line 16, for "pm/RT" read -- $p\overline{m}/RT$ --; column 6, line 62, strike out "streams are substantially equal at 1400° K. For the" and insert instead -- momentum is achieved by the use of an insert in the --.

Signed and sealed this 1st day of April 1969.

(SEAL)
Attest:

Edward M. Fletcher, Jr.                          EDWARD J. BRENNER
Attesting Officer                                Commissioner of Patents